(12) United States Patent
Heselhaus

(10) Patent No.: US 7,438,343 B2
(45) Date of Patent: Oct. 21, 2008

(54) CONVERTIBLE

(76) Inventor: Udo Heselhaus, Aldersenstrasse 58, Ibbenburen (DE)

( * ) Notice: Subject to any disclaimer, the term of this patent is extended or adjusted under 35 U.S.C. 154(b) by 0 days.

(21) Appl. No.: 10/568,354

(22) PCT Filed: Aug. 4, 2004

(86) PCT No.: PCT/DE2004/001737
§ 371 (c)(1),
(2), (4) Date: Jan. 12, 2007

(87) PCT Pub. No.: WO2005/016678
PCT Pub. Date: Feb. 24, 2005

(65) Prior Publication Data
US 2007/0194593 A1    Aug. 23, 2007

(30) Foreign Application Priority Data
Aug. 14, 2003   (DE) ................... 103 37 474

(51) Int. Cl.
*B60J 7/08* (2006.01)
(52) U.S. Cl. .................. 296/107.01; 296/116; 296/117
(58) Field of Classification Search ............... 296/116, 296/117, 107.01
See application file for complete search history.

(56) References Cited

U.S. PATENT DOCUMENTS

| | | | |
|---|---|---|---|
| 1,799,050 A | * | 3/1931 | Kuturlash ................ 296/117 |
| 6,086,958 A | | 7/2000 | Russell et al. |
| 6,325,445 B1 | | 12/2001 | Schenk |
| 6,824,194 B2 | | 11/2004 | Weissmueller et al. |
| 7,178,852 B2 | | 2/2007 | Obendiek et al. |
| 2003/0218355 A1 | | 11/2003 | Stenvers et al. |
| 2005/0029833 A1 | | 2/2005 | Obendiek |

FOREIGN PATENT DOCUMENTS

| | | |
|---|---|---|
| DE | 10159390 C1 | 11/2002 |
| EP | 1074415 A2 | 2/2001 |

* cited by examiner

*Primary Examiner*—Lori L Lyjak
(74) *Attorney, Agent, or Firm*—Howrey, LLP

(57) ABSTRACT

A convertible vehicle (1) with at least one flexible roof area (10) supported by way of transverse hoops (12; 13; 14; 15; 16) lying in succession over its longitudinal course that can be shortened for opening it by displacement of transverse hoops (12; 13; 14; 15) with a movement component in vehicle longitudinal direction is designed in such a way that one longitudinal guiding aid (23; 24; 25) is assigned to a transverse hoop (13; 14; 15) for cooperation with a longitudinal guiding projection (30; 27; 28) of another transverse hoop (12; 13; 14) pointing in its direction (FIG. 2).

8 Claims, 5 Drawing Sheets

CONVERTIBLE

Figure 1:
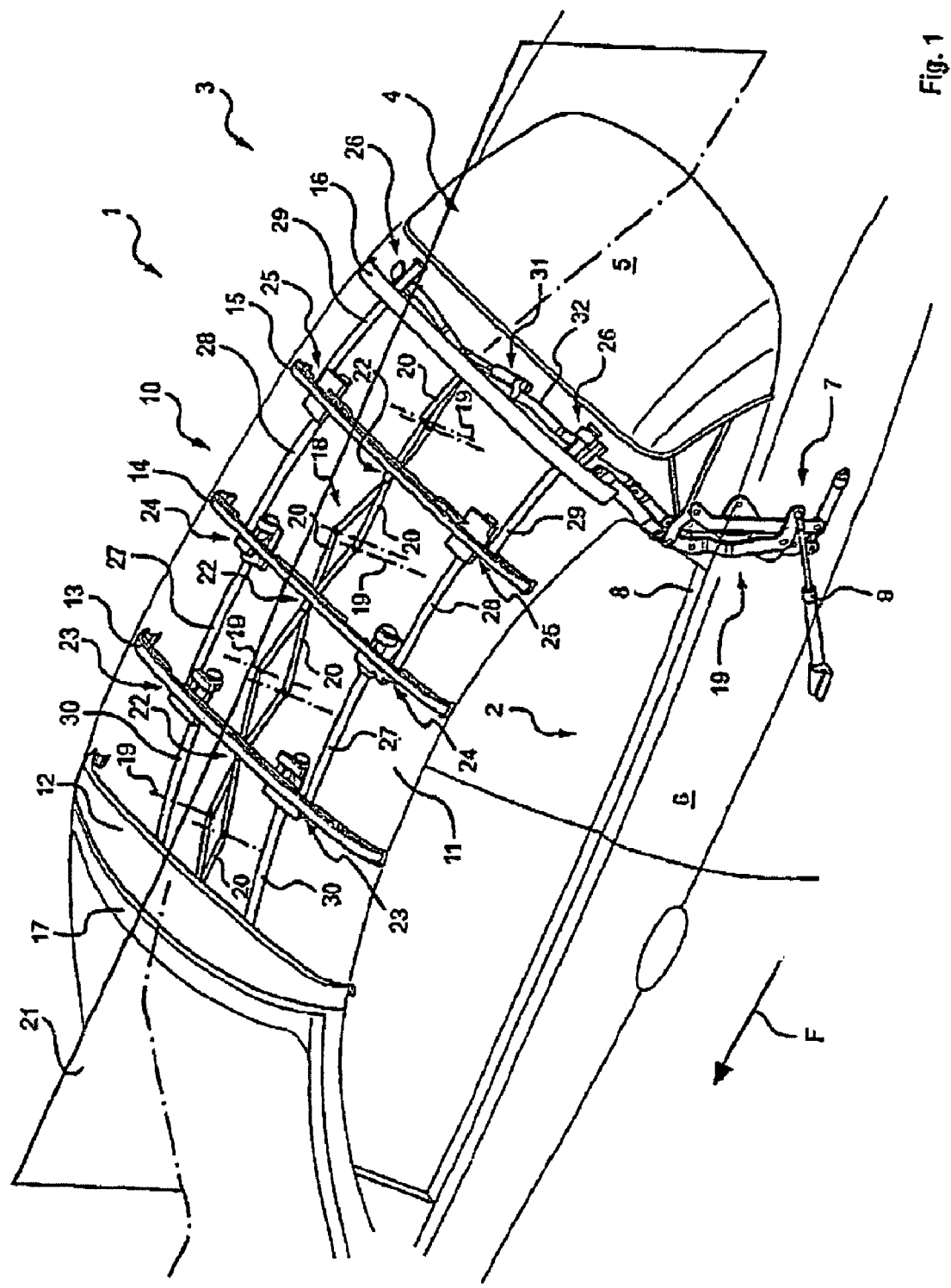

The invention relates to a convertible vehicle with at least one flexible roof area that can also comprise essentially the entire roof according to the preamble of claim 1 and according to the preamble of claim 6.

DE 101 40 232 A1 shows a convertible vehicle with a rigid rear roof part and a flexible roof area on it that follows in driving direction, which comprises a roof covering held by several transverse hoops. The transverse hoops are connected to each other in a known way by way of lateral frame parts. For opening the flexible roof area, these frame parts are swiveled with respect to each other around vertical axes. This is done by several drives arranged on the respective longitudinal sides of the vehicle. In order to ensure a uniform shortening of the roof area in the opening phase, these must be synchronized with each other, which is complicated. In addition, the folding mechanism of the lateral frame parts that is shown is complicated and additional measures must be taken in order to avoid uncontrolled folding of the roof covering and its jamming in the link areas.

The invention is based on the problem of optimizing a convertible vehicle of the type named with respect to the opening kinematics of the flexible roof area.

The invention solves this problem by a convertible vehicle with the characteristics of claim 1 and by a convertible vehicle with the characteristics of claim 6, which can be implemented individually or in combination with each other. Advantageous designs of the object of the invention will be found in the other claims 2 to 5 and 7 to 17.

The design according to claim 1 in the invention causes a mechanical controlled longitudinal guidance of the flexible roof area. Therefore, a case is prevented, in which opposite longitudinal side areas are moved backward at different speeds during opening and can make the roof area crooked. During the opening movement, the transverse hoops are thus also parallel to each other at all times without synchronizing measures. Lateral rod parts can be dispensed with so that there is a lot of head room and shoulder room even during the roof movement.

Because of an advantageous engagement with each other of longitudinal guiding aids and longitudinal guiding projections—even with the roof closed—a procedure for threading the parts can be dispensed with. The roof opening is thereby accelerated.

In particular, if a rigid rear roof part is provided, the front of which connects with the flexible roof area, the opening can be further accelerated if during the lowering of the rigid roof part, the shortening movement of the front, flexible roof area takes place simultaneously.

When the guiding aids and guiding projections of the drive are completely decoupled, the design is additionally simplified.

In this case, a single element, e.g. a hydraulic cylinder, can be adequate if it provides the driving force by way of a slidable lattice gate lying in the longitudinal center plane on the flexible roof area. Because of the combination that is not mandatory, but advantageous, the parallel movement of both longitudinal sides is ensured with the longitudinal guiding projections and the longitudinal guiding aids, even without lateral frame parts, in spite of only having a center drive. In any case, when the drive is implemented using the central slidable lattice gate, the head room and shoulder room are increased since lateral parts of the drive kinematics are not present which especially lead to restrictions in space during the movement of the roof.

Other advantages and characteristics of the invention will be found from an embodiment example shown in the drawing and described in the following of the object of the invention.

Figure 2:
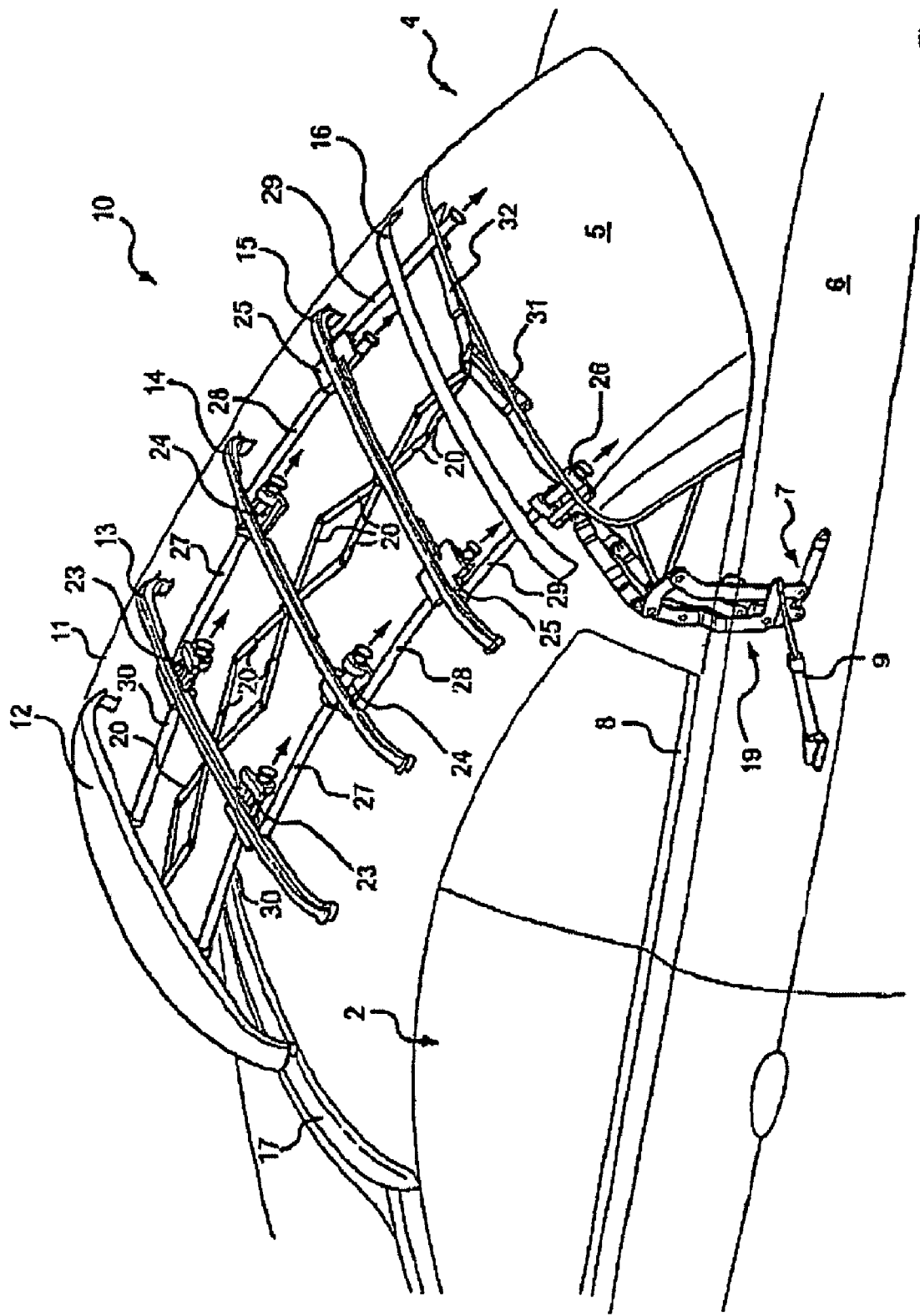
Figure 3:
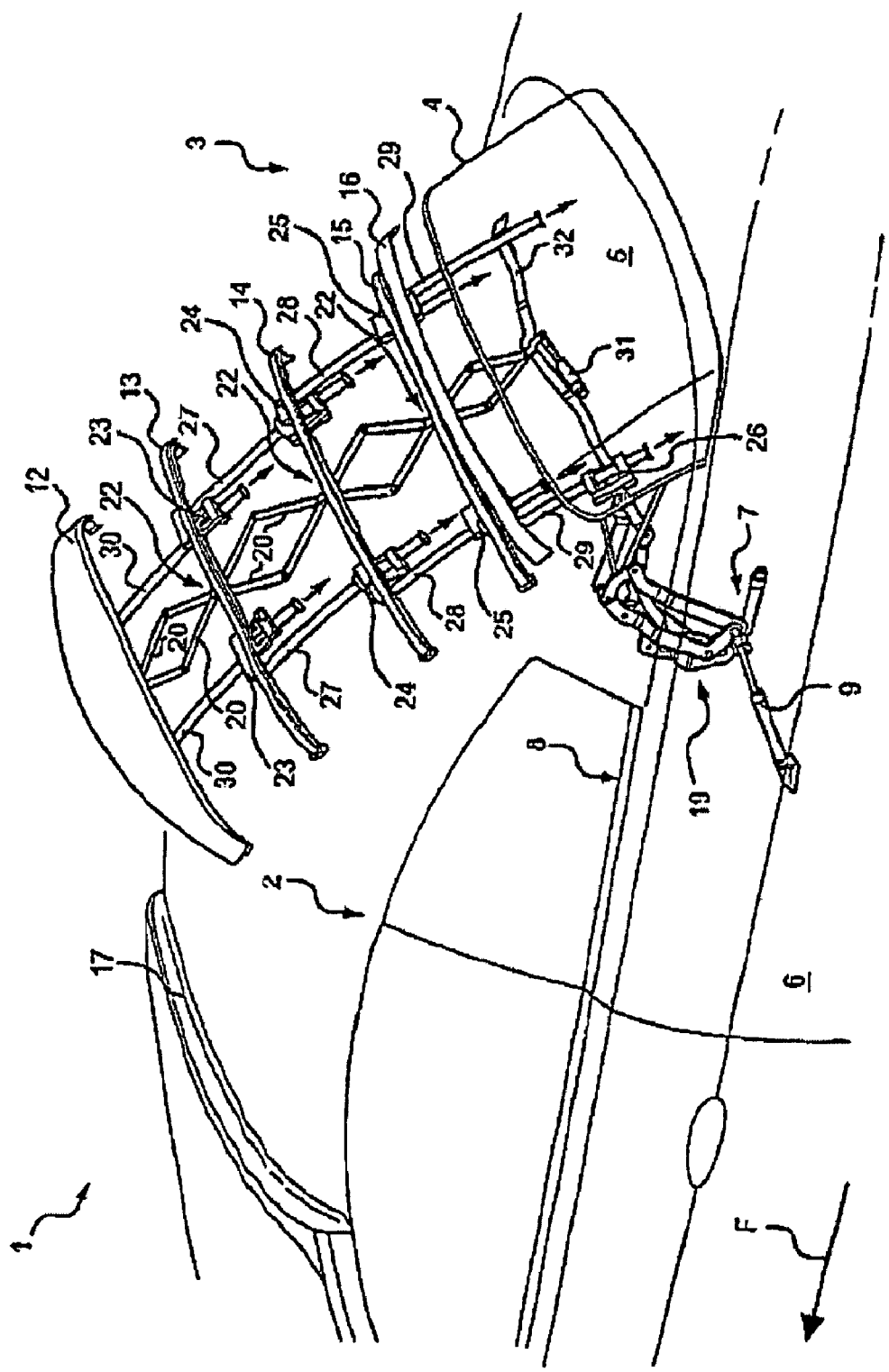
Figure 4:
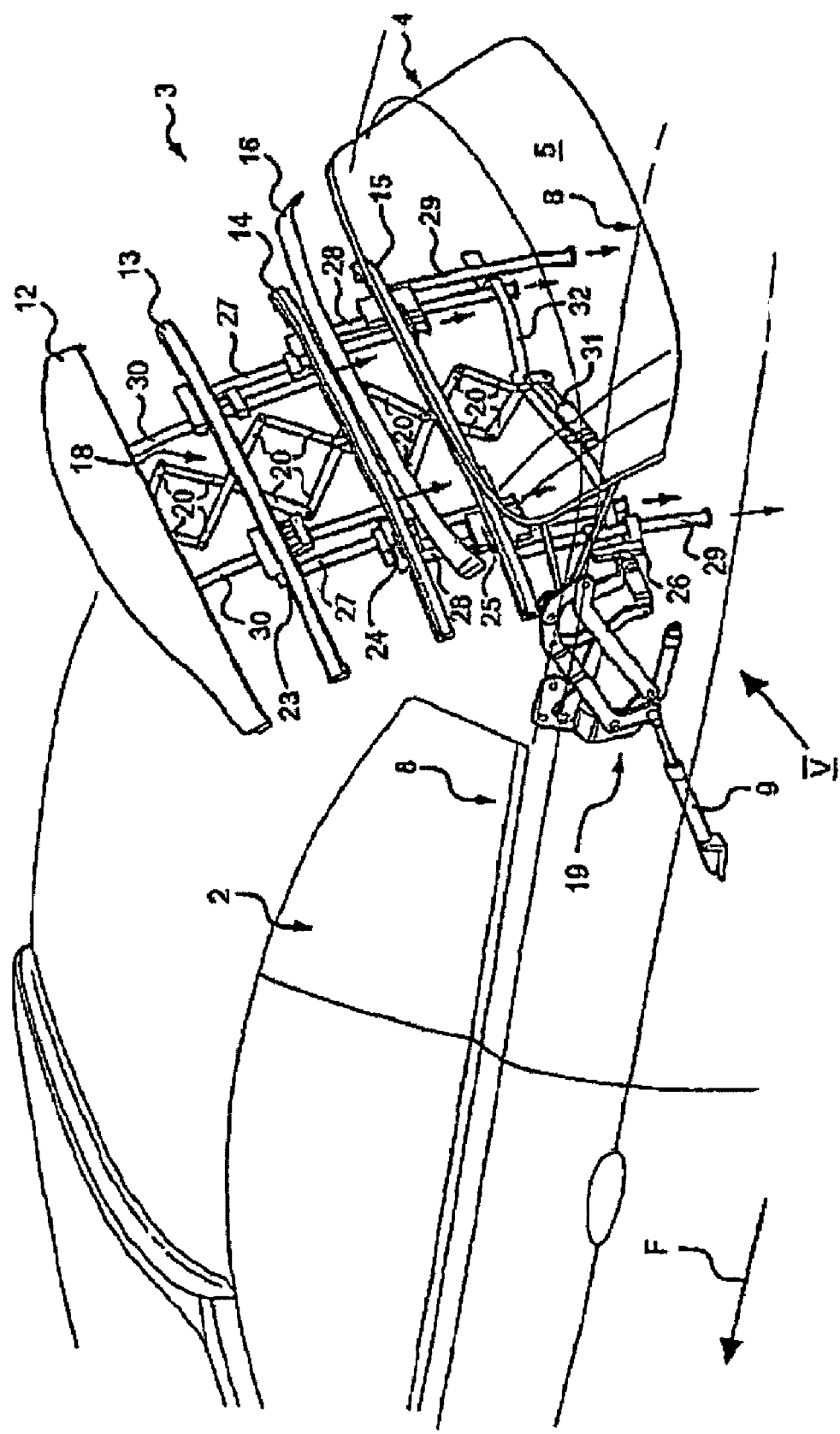
Figure 5:
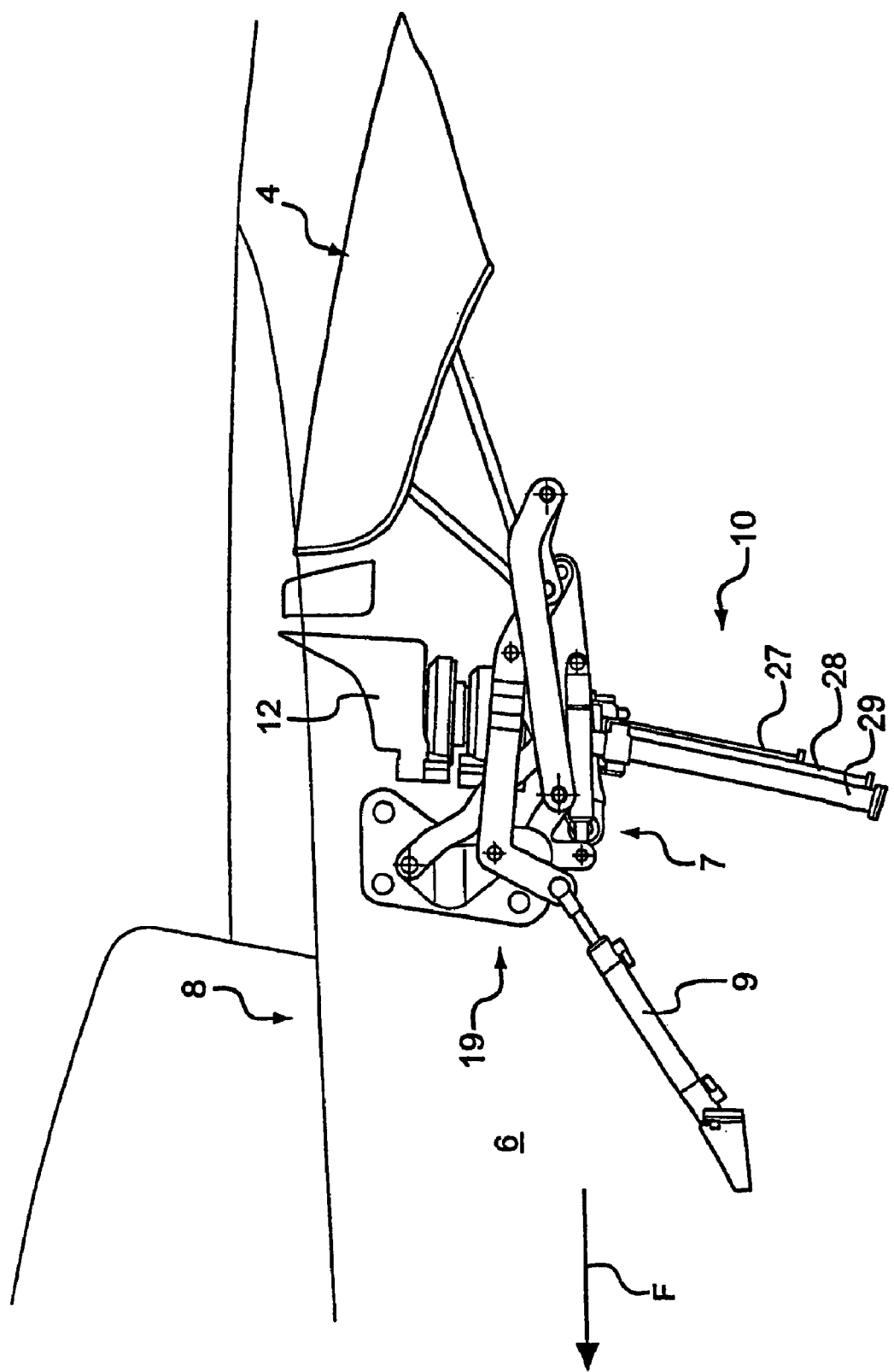

The following are shown in the drawings:

FIG. 1 a schematic perspective cutaway view of a convertible vehicle according to the invention with closed roof with a roof covering that is shown semi-transparent for the sake of clarity, FIG. 2 a view similar to FIG. 1 while the roof is being opened with rigid roof part and shortening flexible roof area that swivel downward simultaneously during the roof opening, FIG. 3 a view similar to FIG. 2 with a further progressed roof opening and/or in the early phase of the roof closing, FIG. 4 a similar view to FIG. 3 with a further progressed roof opening and/or in the early phase of the roof closing, FIG. 5 a side view toward the completely opened roof, i.e. from the direction of arrow V in FIG. 4.

The upper and center area of convertible vehicle 1 according to the invention, which comprises the passenger compartment 2, is shown schematically in FIG. 1. This can be covered by a movable roof 3 that is closed according to the illustration in FIG. 1.

In the embodiment example, the roof 3 comprises a rigid rear roof part 4, which in this case comprises a dome-like rear window 5 which can be provided outside a center viewing area with a dark, light and/or heat-absorbent coating. This is connected to the body 6 by way of lateral main bearings 7 so that it can move and can be stored completely in the body below an apron wall 8. To swivel the rear roof part 4 around the main bearing 7, lateral driving elements 9 are used if an automatic roof opening and closing will be implemented.

When the roof is closed (FIG. 1) a flexible roof area that is designated with 10 overall is connected to the rigid roof part 4 in driving direction F. This comprises a covering 11 made, for example, of textile or plastic that is shown so that it is transparent in FIG. 1 for the sake of visibility. Because of this, several transverse hoops 12, 13, 14, 15, 16 that support the covering 11 are visible. In this case, the front hoop 12 forms the so-called roof peak, which is locked with the windshield frame 17 when the roof 3 is closed.

A slidable lattice grate 18 that lies centrally and symmetrically to the vertical vehicle longitudinal center plane 21 also engages under covering 11. This is connected, at least, to the front transverse hoop 12. The slidable lattice grate 18 lies in the extension plane of the flexible roof area 10 and has a number of swivel axes 19 that are perpendicular to it around which the individual control arms 20 of the slidable lattice gate can be swiveled in and out.

Because of the position in the extension plane of the roof 3, a minimum and flat stowing dimension for the folded slidable lattice gate 18 results when the roof is open. Because of the central arrangement of the slidable lattice gate 18 lying in the longitudinal center plane, it lies centrally in an area in which no rod parts 19 or drive parts 9 connected to the main bearing 7 lie even when the roof 3 is open. In addition, head room and shoulder room are significantly increased because of the central arrangement. Lateral frame parts for a drive of the roof folding movement can be dispensed with completely.

At intersection points 22 of the control arms 20, these are connected to transverse hoops 13, 14, 15 lying behind the roof peak 12, which is not absolutely necessary. Because of the connection with all of the hoops, however, during opening the spaces between them can be reduced uniformly since they are all pulled backward around axis 19 when the control arm 20 is swiveled in.

On the transverse hoops 13, 14, 15, the flexible roof area 10 comprises two longitudinal guiding aids 23, 24, 25 and two longitudinal guiding projections 27, 28, 29 on both sides of the vertical longitudinal center plane 21 and symmetrical to it. In addition, the front hoop 12 has two longitudinal guiding projections 30, and additionally two longitudinal guiding aids 26 are arranged behind the most rearward hoop 16. The latter-named are connected to the control arms 19 of the swiveling mechanism for the rear rigid roof part 4.

The longitudinal guiding projections 27, 28, 29, 30 are designed as dimensionally stable pipe sections and in top view extend approximately parallel to the vehicle longitudinal direction, whereby a slight angling would also be possible here. With respect to the horizontal, they are either set slightly diagonally according to the roof curvature and/or bent inward, which has an especially positive visual effect on short roofs with great curvature.

The longitudinal guiding aids 23, 24, 25, 26 are also dimensionally stable and comprise sleeve elements, each of which are angled according to the roof curvature and each engaged in longitudinal guiding projections 27, 28, 29, 30. The width of the respective sleeve is dimensioned in such a way that they tightly engage with the longitudinal guiding projections 23, 24, 25, 26 but make possible a relative movement of the parts with respect to each other parallel to the extension of the longitudinal projections 23, 24, 25, 26. In the embodiment example, the engagement position of the parts exists not only when the roof is moving or open, but also when the roof is closed so no special measures have to be provided for central threading.

By way of the longitudinal guiding aids 23, 24, 25, 26 and longitudinal guiding projections 27, 28, 29, 30, no drive force has to be provided so no synchronization is necessary even during movement of the roof sides. The introduction of force occurs only by way of the slidable lattice grate that lies centrally and a central drive element 31 that swivels the control arm 20 around the axis 19.

In detail, the arrangement of longitudinal guiding aids 23, 24, 25, 26 and longitudinal guiding projections 27, 28, 29, 30 is as follows in the embodiment example shown:

At the roof peak 12, only two pipe pieces 30 are arranged symmetrically which point toward the back and engage in sleeves of the longitudinal guiding aids 23 of the adjacent hoop 13 toward the rear.

this has pipe pieces 27 that lie further outside with respect to the vertical vehicle longitudinal center plane 21 and also point backward as longitudinal guiding projections, which in turn engage in sleeves of the longitudinal guiding aids 24 of the adjacent hoop 14 that points backward.

This third transverse hoop also has pipe pieces 28 that lie further toward the outside with respect to the vertical vehicle longitudinal center plane 21 in comparison to its longitudinal guiding aids 24 as longitudinal guiding projections, which in turn engage in sleeves of the longitudinal guiding aids 25 of the adjacent hoop 15 toward the rear.

The relationships are repeated there: this one also has pipe pieces 29 that lie further outward with respect to the vertical longitudinal vehicle center plane 21 and also point toward the back as longitudinal guiding projections, which then engage below the rear hoop 16 without a connection and engage in longitudinal guiding aids 26 of a rear transverse control arm arrangement 32 that can move by way of control arm arrangement 19. The hoop 16 secures the connection of the cover material 11 on the rear roof part 4.

Therefore, overall the longitudinal guiding projections 30, 27, 28, 29 of successive hoops 12, 13, 14, 15 are offset with respect to each other with respect to the vertical longitudinal center plane 21, namely in such a way that they are always arranged further outward from forward to back. Therefore, a collision of the pipe pieces is prevented even during the roof opening when roof area 10 is shortened.

However, simultaneously at each hoop 13, 14, 15 the longitudinal guiding aid 23, 24, 25 for the longitudinal guiding projections 30, 27, 28 of the next hoop in succession are immediately adjacent so that the longitudinal guiding projections 27, 28, 29, 30 overall form a longitudinal frame for the roof area 10 and lie immediately adjacent to each other when roof 3 is open.

For opening the roof 3, from the beginning (transition from FIG. 1 to FIG. 2) both the rear roof part 4 is swiveled downward into the body 6 and the front roof area 10 is shortened and moved upwards so that at the end both roof parts 4, 10 lie below the same apron wall 8 (FIG. 5). The roof movement is considerably accelerated because of this combination of simultaneous movement sequences.

Because of the vertical position of the front roof part 10 that is shown here during opening, when roof 3 is completely lowered, the longitudinal guiding projections 30, 27, 28, 29 lie essentially vertical and adjacent to each other (FIG. 5) so that a flat package with little height is formed due to the shortening, which can be placed e.g. behind the backrests of a seating row without great luggage compartment restrictions. The rear roof part 4 then lies over this package or slightly behind it under a luggage compartment lid and with its curvature that points outward needs only a little space.

The invention claimed is:

1. A roof for a motor vehicle, comprising:
a substantially flexible roof part that is collapsible in a longitudinal direction of the vehicle;
a first transverse hoop and a second transverse hoop for supporting the substantially flexible roof part, the first transverse hoop positioned substantially at a first end of the roof and the second transverse hoop positioned substantially at a second end of the roof;
at least one transverse hoop positioned between the first and second transverse hoops and providing at least some support for the substantially flexible roof part, the first and second transverse hoops and the at least one transverse hoop each lying in succession over a longitudinal center plane of the vehicle;
at least one longitudinal guiding projection connectable to the at least one transverse hoop; and
at least one longitudinal guiding aid connectable to the at least one transverse hoop, wherein
the longitudinal guiding aid of one transverse hoop connects to the longitudinal guiding projection of another transverse hoop, and
the at least one longitudinal guiding aid and the at least one longitudinal guiding projection connectable to the at least one transverse hoop lie parallel and adjacent to each other along a horizontal plane in the vehicle longitudinal direction.

2. The roof as claimed in claim 1, further comprising:
a first engaging part positioned substantially on the at least one longitudinal guiding projection; and
a second engaging part positioned substantially on the at least one longitudinal guiding aid, wherein the first engaging part and the second engaging part engages to allow the at least one longitudinal guiding projection and the at least one longitudinal guiding aid to move relative to an engaging position of the at least one longitudinal guiding projection and the at least one longitudinal guiding aid.

3. The roof as claimed in claim 2, wherein the at least one longitudinal guiding projection and the at least one longitudinal guiding aid are capable of engaging when the roof is in a substantially opened and substantially closed position.

4. The roof as claimed in claim 1, further comprising:
a slidable lattice grate positioned along the vehicle longitudinal center plane and lying in the horizontal plane of the flexible roof part, the slidable lattice grate including a plurality of swivel axes allowing the slidable lattice grate to swivel.

5. The roof as claimed in claim 4, further comprising a driving unit for moving the slidable lattice grate.

6. The roof as claimed in claim 5, wherein the slidable lattice grate provides a movement of the flexible roof part independently of the at least one longitudinal guiding projection and the at least one longitudinal guiding aid.

7. The roof as claimed in claim 4, wherein the at least one longitudinal guiding projection and the at least one longitudinal guiding aid are provided on opposite sides of the slidable lattice grate.

8. The roof as claimed in claim 1, further comprising:
a roof section positioned substantially to the second end of the roof, the roof section capable of being positioned into a body of the vehicle when the flexible roof part is collapsed.

* * * * *